United States Patent [19]

Reid et al.

[11] 4,311,041
[45] Jan. 19, 1982

[54] DIAGNOSIS OF ENGINE LUBRICANT SYSTEM

[75] Inventors: David L. Reid; Dennis O. Taylor, both of Columbus, Ind.

[73] Assignee: Cummins Engine Company, Inc., Columbus, Ind.

[21] Appl. No.: 47,067

[22] Filed: Jun. 11, 1979

[51] Int. Cl.³ .......................................... G01M 15/00
[52] U.S. Cl. .................................................. 73/117.3
[58] Field of Search .................... 73/119 A, 118, 116, 73/49.7, 117.3; 364/431, 551

[56] References Cited

U.S. PATENT DOCUMENTS 4,064,747 12/1977 Rackliffe et al. ..................... 73/116

FOREIGN PATENT DOCUMENTS 1316451 5/1973 United Kingdom .

Primary Examiner—Jerry W. Myracle
Attorney, Agent, or Firm—Merriam, Marshall & Bicknell

[57] ABSTRACT

This disclosure relates to a system for analyzing the performance of a reciprocating piston, internal combustion engine such as a diesel engine. Sensors are connected to the engine, which respond to various operating parameters, and signals representing the parameters are fed to computer processing equipment. Two of the parameters are the lubricant system pressure and the engine speed. To test the lubricant system, the engine speed is stabilized at maximum governed speed and then the fuel supply to the engine is quickly cut off. The lubricant system pressure and the engine speed data are sensed and processed as the engine decelerates, the processing including a comparison of the pressure-speed characteristic with a standard or reference characteristic.

9 Claims, 7 Drawing Figures

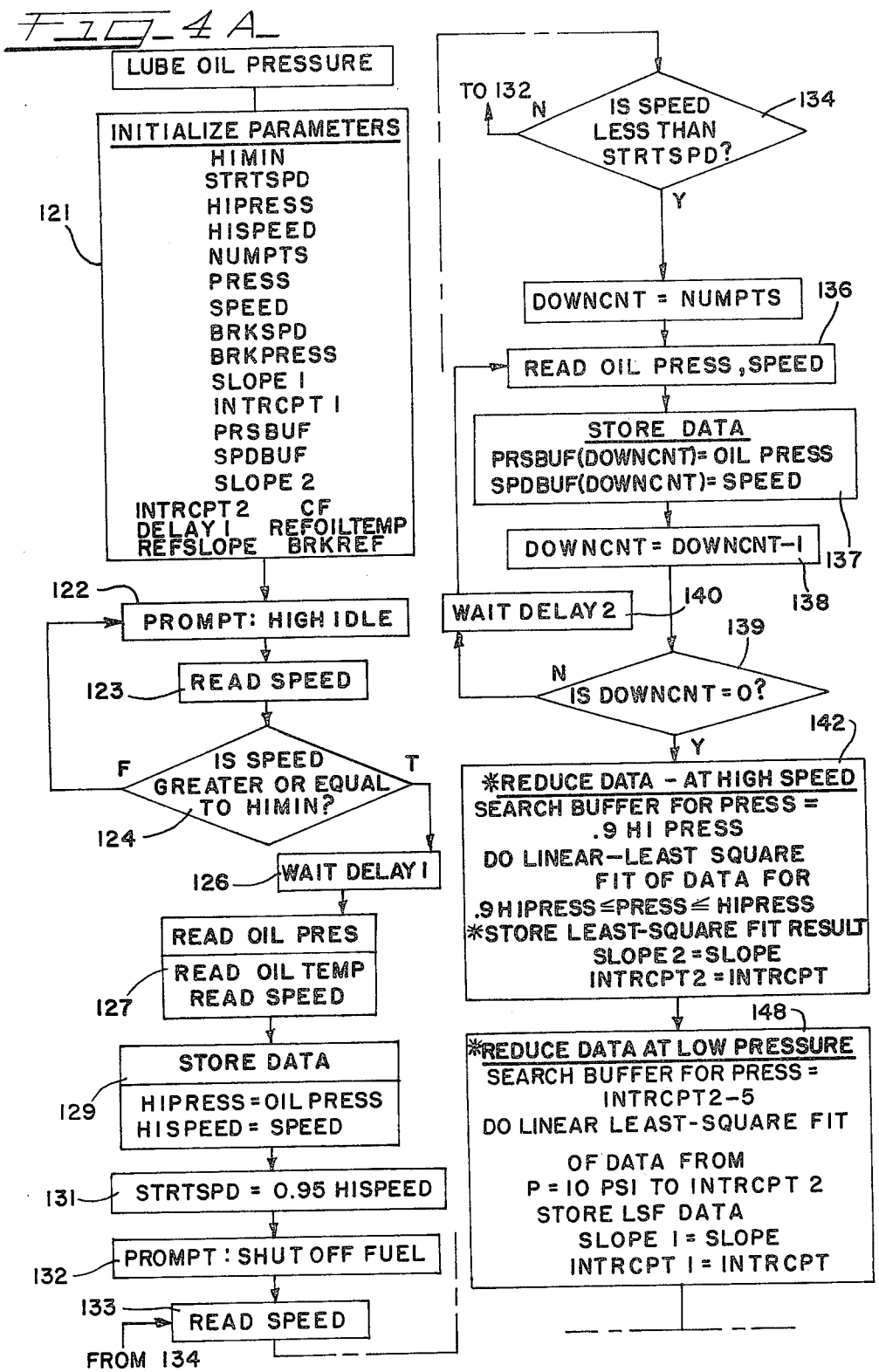

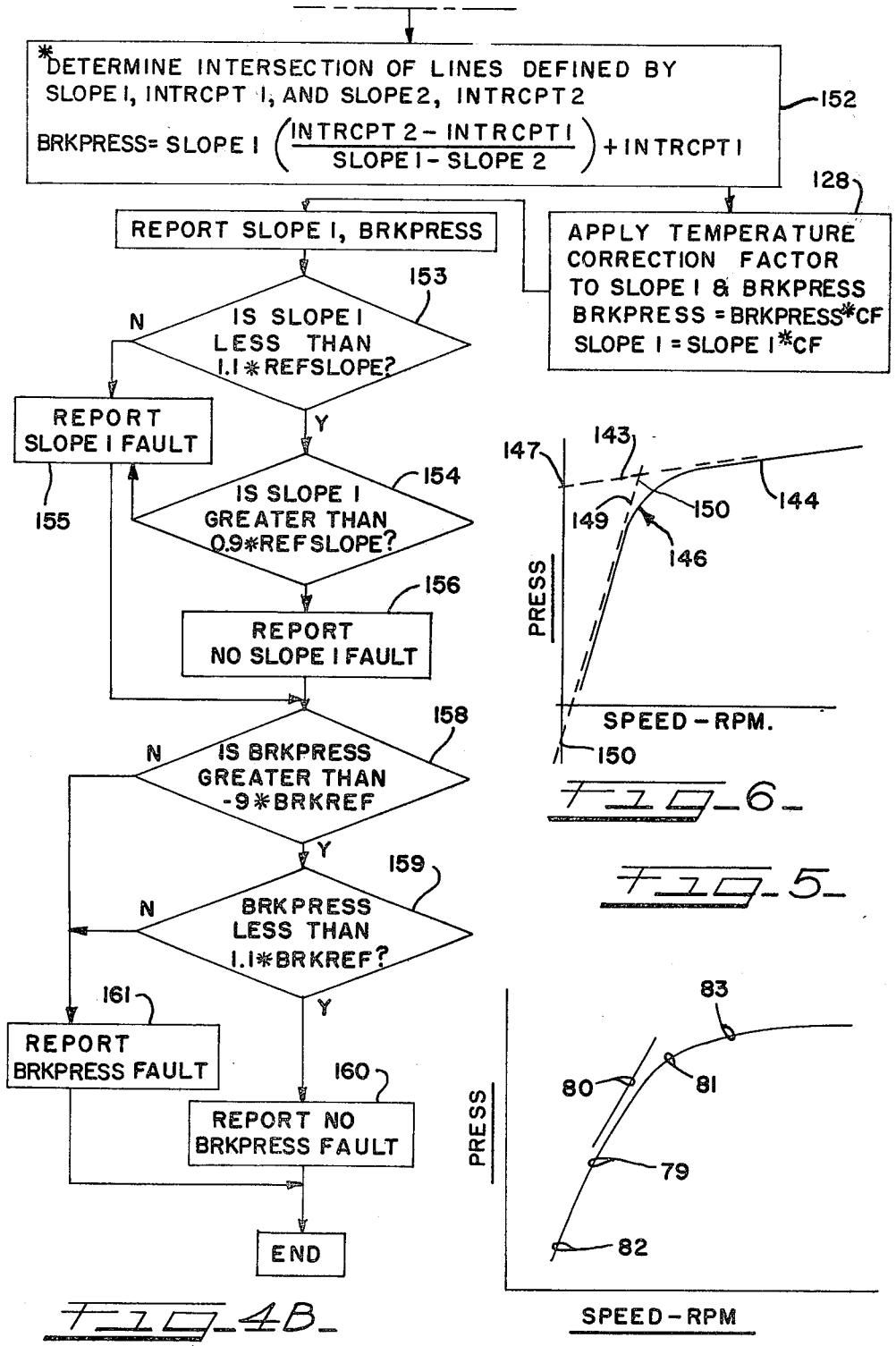

DIAGNOSIS OF ENGINE LUBRICANT SYSTEM

A conventional reciprocating piston, internal combustion engine includes a lubricating system for lubricating the operating parts of the engine. The customary system includes a lubricant circulating pump and a flow passage or rifle that receives lubricant from the pump and distributes it to different areas of the engine. The pump is usually a positive displacement type, such as a gear pump, which is driven from the engine crankshaft, and consequently, the pump output is a direct function of engine speed. When the engine speed increases from low idle, the lubricant system pressure also increases until an operating pressure level is reached, and the system pressure then stabilizes and remains at this pressure as long as the engine speed is maintained. The operating pressure level is controlled by a pressure relief valve that is connected across the pump.

As the various operating parts including the pump of the engine wear during normal operation of the engine, the rate at which the pressure rises with increasing engine speed usually drops. Further, the operating pressure level may also decrease somewhat. The drop in the rate of the pressure rise is due both to wear of the gear pump and to a widening, due to wear, of the lubricant flow passages, thereby lowering the system resistance. Further, a lube filter in the system ahead of the distribution lines adds resistance which increases with use, and the filter resistance produces a pressure drop downstream of it.

One method of testing the performance of an engine lubricating system, is to sense the lubricant system pressure as the engine accelerates and to determine the pressure and engine speed at which the pressure relief valve opens. However, this procedure does not provide as much information as is normally desired. It would be preferably to obtain continuous readings of the lubricant pressure as the engine is gradually increased from low idle speed to high idle speed, in a quasi-steady manner, but in doing so it is difficult to maintain certain conditions, such as lubricant temperature constant. The manual method of performing this test consists of repeating the steps of: (a) adjusting the engine to a given speed, (b) allowing the system pressure to stabilize and take a reading, (c) bringing the engine to a slightly higher speed, (d) allowing the system pressure to again stabilize and taking another reading, (e) bringing the engine to another slightly higher speed, (f) etc. It should be apparent that the foregoing both takes a lot of time and normally requires a skilled technician.

U.S. Pat. No. 4,125,014 discloses an oil pump test, but it requires a special housing and test valve assembly, and therefore, it is not satisfactory.

It is a general object of the present invention to provide an improved apparatus and method for testing an engine lubricant system, which provides a more desirable deceleration characteristic while avoiding the foregoing disadvantages.

A method in accordance with the present invention comprises the steps of starting an engine to be tested and stabilizing the engine at a speed that is higher than the speed at which the lubricant system pressure regulator operates, moving the engine speed control to decelerate the engine to a low speed, sensing and storing the lubricant system pressure and the engine speed as the engine decelerates, and processing and comparing the measured data with reference data.

The low speed mentioned above may be a speed below the normal idle speed, or it may be zero speed reached by cutting off the fuel supply.

The apparatus in accordance with the invention comprises lubricant system pressure and engine speed sensors, and processing means responsive to the sensors for performing the method.

The foregoing and other objects and advantages of the present invention will be better understood from the following detailed description taken in conjunction with the accompanying figures of the drawings, wherein:

FIGS. 4A to 4B show a flow chart of the system; and

FIGS. 5 and 6 are curves illustrating the operation of the system.

DETAILED DESCRIPTION

Figure 1:
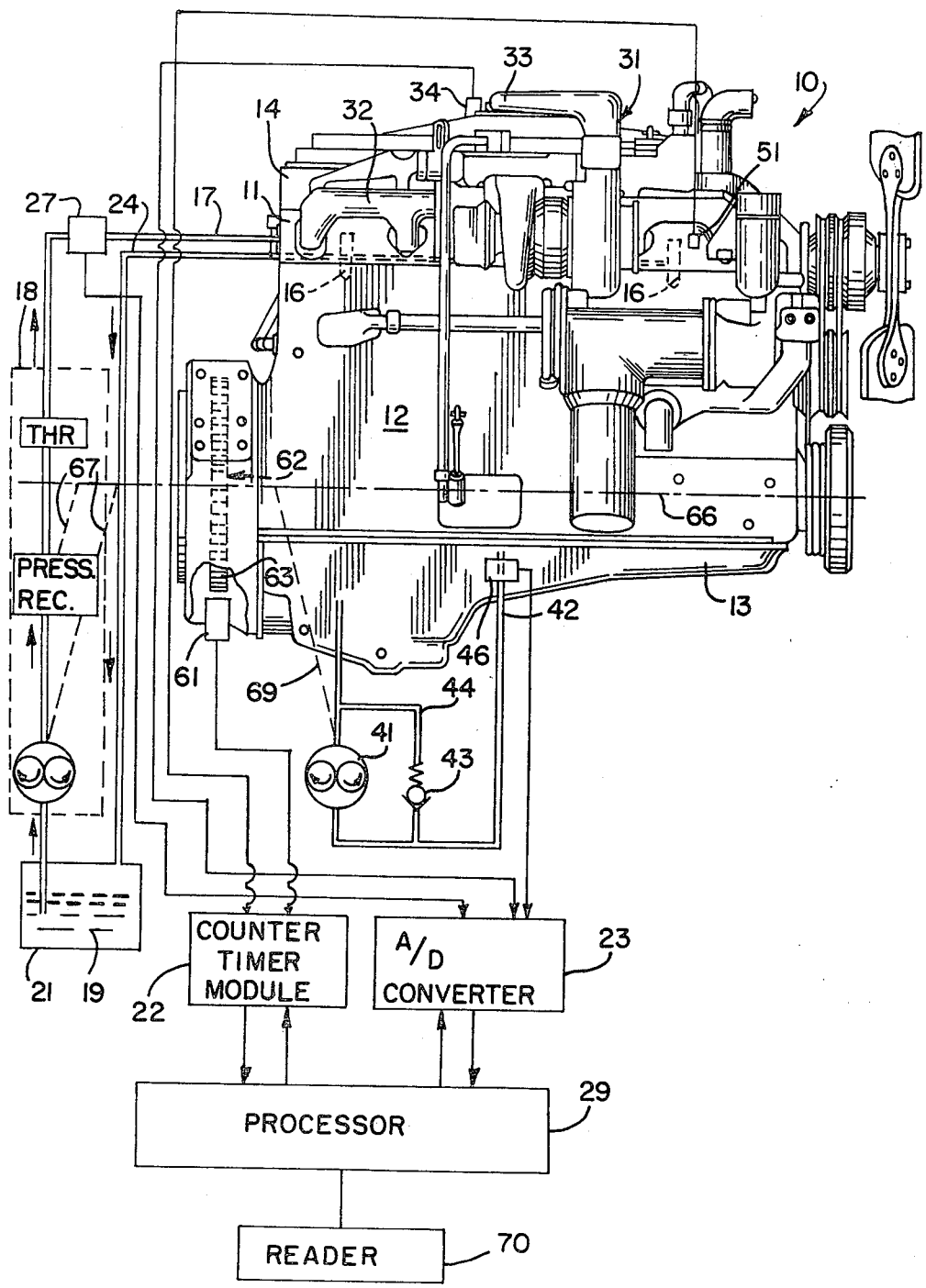
FIG. 1 is a view of an engine including a test system in accordance with the present invention.

With reference to FIG. 1, an engine 10 is illustrated which may be a standard internal combustion engine such as the NH series, six cylinder, in-line reciprocating piston, diesel engine manufactured by Cummins Engine Company, Inc. Such an engine includes a head 11, a block 12, an oil pan 13 and a rocker housing 14 fastened to the upper side of the head 11. The pistons (not shown) of the engine reciprocate within cylinders (also not shown) and are connected to rotate a crankshaft 66. A flywheel on the crankshaft has a ring gear 62 attached to it, teeth 63 on the gear 62 being selectively engaged by a starter motor (not shown) for starting the engine.

A plurality of fuel injectors 16 inject metered quantities of fuel into the cylinders after inlet air within the cylinders has been compressed sufficiently to cause compression ignition of the resultant combustable mixture. The injectors 16 may be a unit type embodying the features of the injectors shown in U.S. Pat. No. 3,351,288. A common fuel supply rail 17 connects the injectors 16 with a fuel supply system including a fuel pump 18 of the character shown in the U.S. Pat. No. 3,139,875. The fuel pump 18 draws fuel 19 from a reservoir or fuel tank 21 and forms a regulated fuel source for the fuel supplied to the rail 17. A throttle is incorporated in the fuel pump 18 and permits the operator of the engine to regulate the fuel pressure delivered to the injectors. Also connected to each of the injectors 16 is a fuel return rail 24 which carries fuel from the injectors 16 to the tank 21.

The engine 10 further includes a turbocharger unit 31 which may have a conventional design. The unit 31 includes a turbine that receives engine exhaust from an exhaust manifold 32 and it further includes a compressor that is connected by a duct 33 to an air intake manifold of the engine.

The engine 10 further includes a lubricant system for circulating a lubricant such as oil through the various operating parts of the engine. The lubricant system includes a pump 41 that draws the lubricant from a reservoir in the crankcase and pan 13 and pumps the lubricant under pressure to a lubricant rifle passage 42 in the block. The pressure in the rifle 42 is regulated by a pressure regulator valve 43 connected in a bypass line 44 that is connected across the pump 41.

A number of mechanical couplings, illustrated by dashed lines in FIG. 1 and indicated by the reference numerals 67 and 69, connect the crankshaft 66 with the fuel pump 18 and the lubricant pump 41, respectively.

A diagnostic system in accordance with the present invention is provided, and includes a cycle event marker (CEM) sensor 51 which is preferably mounted in the rocker housing 14 and responds to the movement of an operating part of the engine. For example, the CEM sensor 51 may be a magnetic coil proximity type sensor that is mounted adjacent the rocker arm that actuates the injector 16 of the number one cylinder. This rocker arm pivots during injection which occurs toward the end of the compression stroke of the piston of the number one cylinder and this movement causes the sensor 51 to generate a CEM signal toward the end of the compression stroke of the piston of the number one cylinder. The CEM signal is utilized in testing engine parameters as will be subsequently described.

Figure 2:
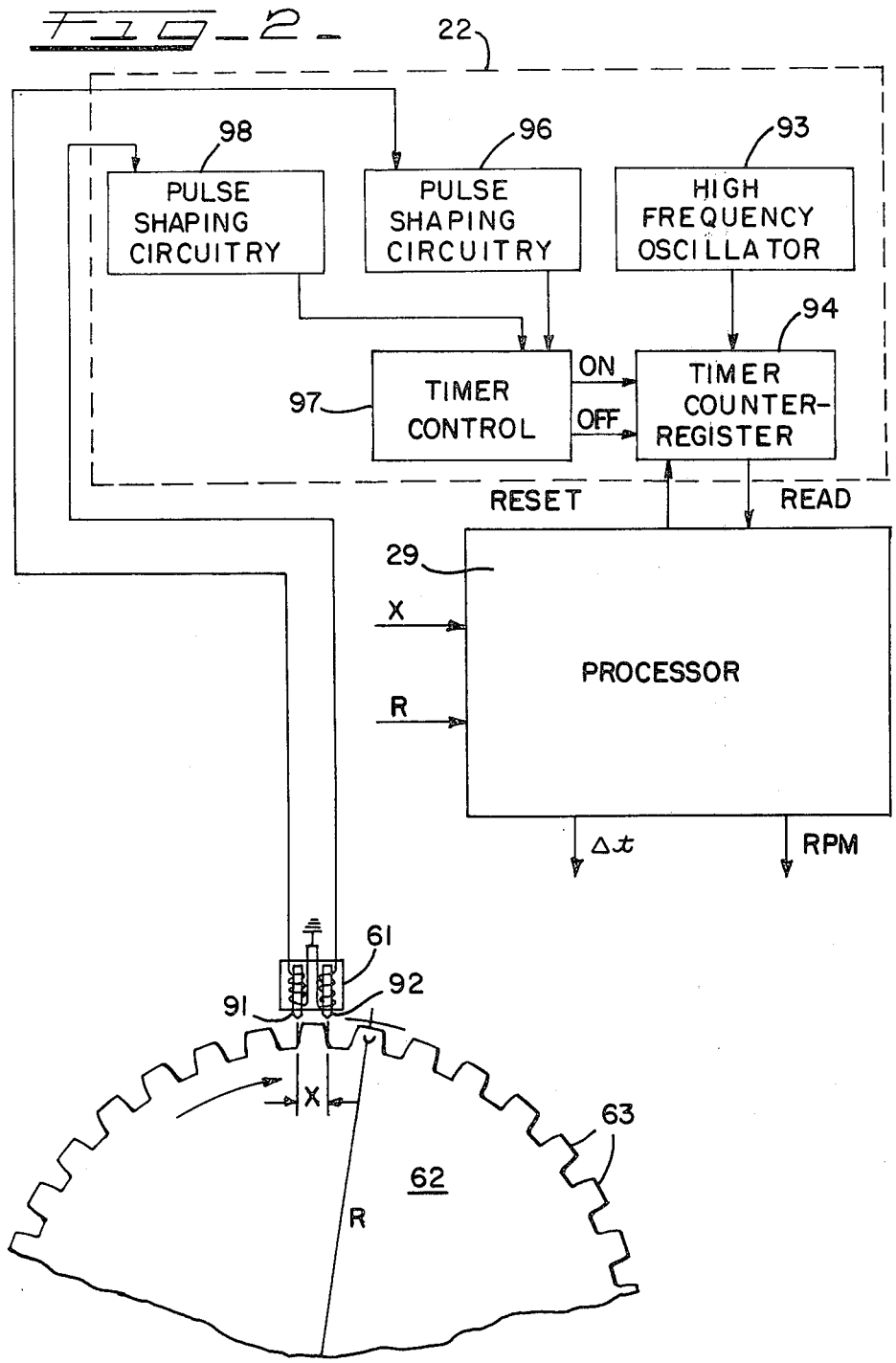
FIG. 2 is a block diagram of a part of the system.

The diagnostic system still further includes an engine speed sensor 61 that is mounted adjacent to the outer periphery of the flywheel ring gear 62 of the engine 10. FIG. 2 illustrates an example of the sensor 61 and the circuits connected to it. The sensor 61 has two spaced elements 91 and 92 which in the present specific example, are variable reluctance magnetic sensors. The teeth 63, moving clockwise, generate signals first in the element 91 and then in the element 92. An oscillator 93 is connected to a counter 94 which is controlled by the tooth pulses from the elements. A pulse from the element 91 operates through circuits 96 and 97 to enable or start the counter 94 and a pulse from the element 92 operates through circuits 98 and 97 to disable or stop the counter. The count associated with each tooth is read by a processor 29. Each count is directly proportional to the time interval ($\Delta t$) for a tooth to move from one element 91 to the other element 92, and inversely proportional to instantaneous speed of the ring gear. A factor for converting counts read to engine RPM may be provided as an input to the processor 29 based on physical measurements, such as the spacing X between the elements 91 and 92 and the radius R of the elements 91 and 92 or may be computed within the processor based on signals from the cycle event marker.

The diagnostic system further includes a number of engine sensors including a fuel pressure sensor 27 connected in the rail 17, a lubricant pressure sensor 46 connected in the rifle passage 42, and an intake manifold air pressure sensor 34 connected in the intake manifold. The sensors 51 and 61 are connected to a counter-timer module 22 and the sensors 27, 34 and 46 are connected to an A/D convertor 23, the components 22 and 23 being connected to the processor 29. The processor 29 provides outputs to a readout device 70 which may provide, for example, visual indications and permanent records.

Figure 3:
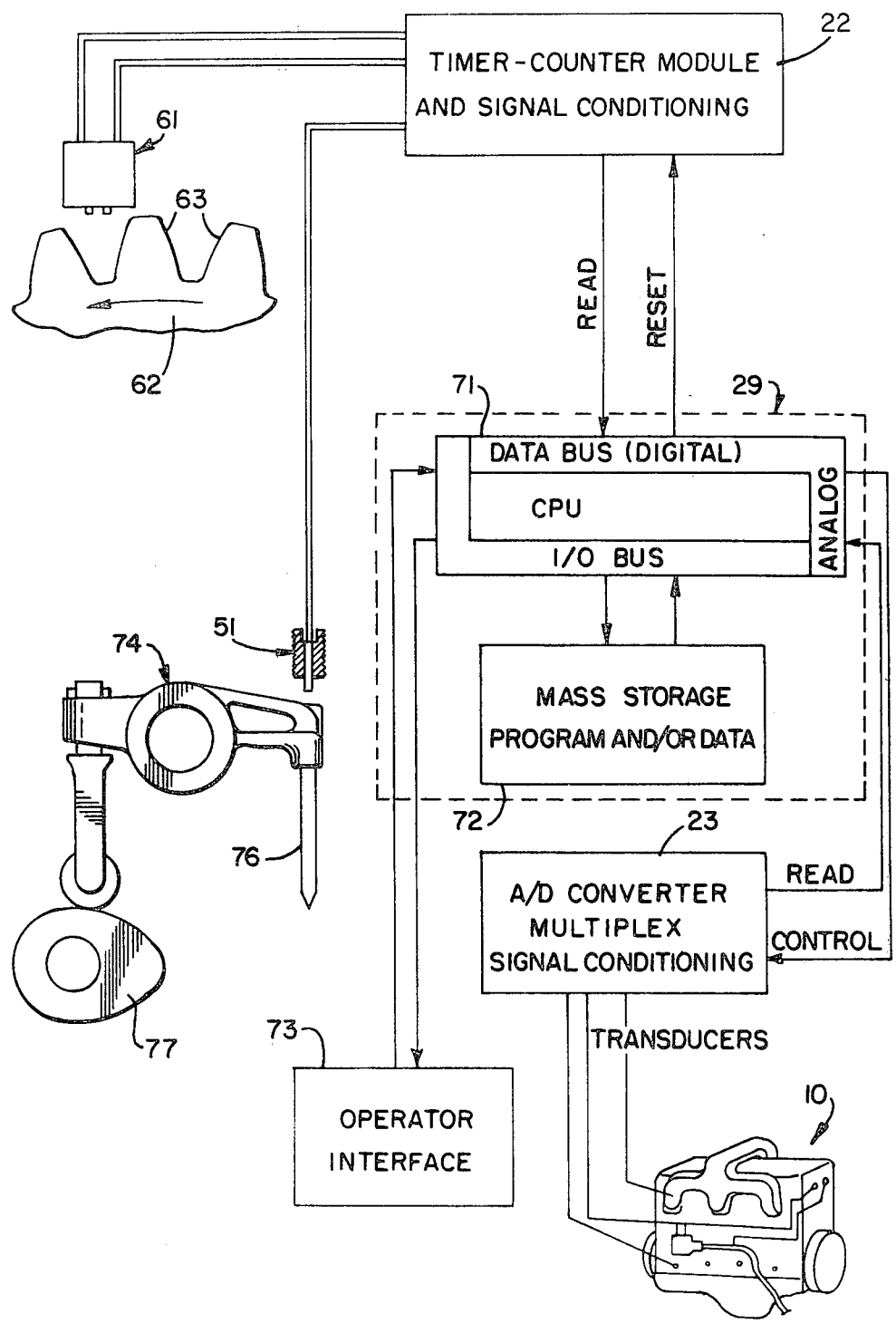
FIG. 3 is a block diagram of the test system.

FIG. 3 illustrates the diagnostic system in greater detail. The processor 29 includes a processing unit 71 and a memory unit 72. An operator interface 73 is connected to the unit 71 and forms means whereby the operator may insert information and instructions and includes the readout 70. The diagnostic system utilizes the signal from the CEM sensor 51 which is shown mounted in a position to sense the movement of a rocker arm 74 for an injector plunger 76. A cam 77 moves the plunger 78 in an injunction stroke toward the end of the compression stroke.

The components 22, 23, 29 and 73 may comprise, for example, standard products of Texas Instruments Company.

FIG. 5 illustrates a typical curve 79 of lubricant system pressure versus the engine speed. The pressure-speed curve 79 obtained by plotting the pressure during an engine deceleration corresponds very closely with a pressure-speed curve obtained when the engine speed is increased in short steps and the engine is stabilized at each step before a sampling is made of the pressure. Apparatus and method in accordance with the present invention obtains the curve 79 which is similar to the steady state curve and which is an accurate indication of the performance of the lubricant system. The curve 79 obtained on deceleration may however be obtained much more quickly and easily than a curve obtained by a series of steady-state measurements.

The curve 79 reveals a considerable amount of information regarding the performance of the lubricant system. The line 80 parallels the change of the pressure with change of engine speed during deceleration, and it corresponds to the intersection of the pump capacity curve with the lubricant system resistance curve, and the slope of the line 80 indicates the amount of wear of the parts. The area 81 of the curve 79, where the maximum curvature occurs, indicates the regulator 43 opening pressure and the engine speed at which the regulator 43 opens and bypasses the lubricant. The pressure at low idle and the pressure at maximum governed speed are indicated by the areas 82 and 83, respectively, of the curve.

The processor 29 shown in FIGS. 1 and 3 processes the information received from the sensors and from the operator, in accordance with the invention. The processor may be a general purpose computer programmed to automatically perform the described operations, and FIG. 4 is a flow chart illustrating a specific example of the method and the programmed operation. It should be understood that the invention is not limited to the specific example, which is given to facilitate the description of the invention.

With reference to the flow chart, at the initial step 121, memory space is allocated for a number of parameters in the system as follows: HIMIN which is the minimum speed to start acquiring data at maximum governed speed; HIPRESS which is the oil pressure recorded at maximum governed speed; HISPEED which is the speed recorded at HIPRESS; STRTSPD which is the engine speed when data starts to be fed to the data buffer; NUMPTS which is the number of data samples to be acquired; BRKSPD which is the engine speed at the regulators break; BRKPRESS which is the lube pressure at the regulator break; PRSBUF and SPDBUF which are the buffers holding the pressure and speed data; SLOPE 1 and INTRCPT 1 which are the slope and intercept of the PRSBUF and SPDBUF data above the regulator break; SLOPE 2 and INTRCPT 2 which are the slope and intercept of the PRESS and SPEED data above the regulator break; PRESS AND SPEED are measured values of lube pressure and engine speed; DELAY 1 is a time delay occurring in the method; and REFSLOPE and BRKREF are reference slope and break pressure value; REFOILTEMP is the lubricant temperature at HISPEED; and CF is a temperature correction factor to relate the test results to standard test conditions.

At the next step 122, the operator is prompted to adjust the engine to maximum governed speed. The prompt and other inputs and readouts may be transmitted via a handheld control unit that forms part of the interface 73. The system then reads engine speed from the sensor 61 at step 123 and at step 124 the speed is compared with HIMIN. If the engine speed exceeds HIMIN the method proceeds to step 126 for a short time delay to allow the engine speed lube pressure, and temperature, to stabilize, and then the lube pressure and temperature and engine speed are read at step 127. At step 129, HIPRESS and HISPEED are defined as equal to the readings from steps 127 and 128 and then stored, and at step 131 STRTSPD is defined as being equal to 0.95 HISPEED.

At step 132 the operator is prompted to shut off the fuel in order to decelerate the engine. The engine speed is read and compared with STRTSPD at steps 133 and 134. When the engine speed drops below STRTSPD, the system starts to take readings of pressure and speed at step 136 and stores the data at step 137 (in PRSBUF and SPDBUF.) The system then loops through steps 136 to 140 until the number of readings equals NUMPTS.

At the next step 142, the high speed data are processed. The PRSBUF is searched to locate the reading equal to 0.9 HIPRESS, and a linear least-squares fit of the pressure readings between 0.9 HIPRESS and HIPRESS is performed. The result is stored as SLOPE 2 and INTRCPT 2. With reference to FIG. 6, the least-squares fit process determines the line 143 which has a slope equal to SLOPE 2, of the high pressure portion 144 of the curve 146. The INTRPCT 2 is indicated by the numeral 147 and is the interception of the line 143 with the pressure axis.

In the next step 148, the low pressure data are processed similarly to the processing in step 142. In the present specific example, the PRSBUF is searched to find the pressure reading equal to INTRCPT 2 minus 5 psi and the data between the point where the pressure equals 10 psi up to level of INTRCPT 2 minus 5 psi is processed to determine SLOPE 1 (line 149) and then INTRCPT 1 (point 150). In an engine of the type previously mentioned, the break pressure at the knee 81 is around 60 psi.

In step 152 the results of step 142 and 148 are processed to determine BRKPRESS, which is the intersection of lines 143 and 149. At step 128, a temperature correction factor or coefficient based on the temperature read at HISPEED is applied to SLOPE 1 and BRKPRESS to relate the test results to standard test conditions. The temperature correction factor, CF, is a function of the temperature observed during the test, which is THISPD, and the reference temperature, FEFOILTEMP, to take into account the change in system pressure with change in lube temperature and viscosity.

In steps 153 to 156, SLOPE 1 is compared with REFSLOPE. If SLOPE 1 is greater than 1.1 or less than 0.9 REFSLOPE, then a fault is reported at step 155. If the measured slope is within this window, then a no fault condition is reported at step 156.

The method then proceeds to steps 158 to 161 where BRKPRESS is compared with BRKREF. If the BRKPRESS is less than 0.9 or greater than 1.1 of BRKREF, then a fault is reported at step 161, but if BRKPRESS is within this window, a no fault condition is indicated at step 16.

The specific example, HIMIN may be 100 rpm above rated engine speed. Readings or samplings of pressure may be taken during deceleration at fixed time intervals (delay 2) or at the rate of approximately two readings per engine revolution, the latter method utilizing the sensor 61 or once every two engine revolutions using the sensor 51. Delay 1 (step 126) may be approximately five seconds.

The system and method described herein are preferably included with a number of other tests performed on various engine parameters, utilizing the sensors described in connection with FIG. 1.

It will be apparent from the foregoing that a novel and useful method and apparatus have been provided for testing the lubricant system of an engine. The invention provides for determining the pressure-speed characteristic and the regulator break point, and this is accomplished in a single run of the engine. Once the sensors have been connected to the engine, the operator simply brings the engine to high speed and then decelerates the engine as by turning off the fuel. The test is quickly made and the results are reliable.

We claim:

1. The method of testing the lubricant system of an internal combustion engine, comprising the steps of sensing the pressure in the lubricant system, sensing the engine speed, stabilizing the engine at a relatively high speed, adjusting the engine for deceleration, and measuring the lubricant pressure and the engine speed during deceleration.

2. The method of claim 1, and further including the step of computing the slope of the low speed portion of the pressure-speed data.

3. The method of claim 2, and further including the step of comprising said slope with a reference slope.

4. The method of claim 1, wherein the lubricant system includes a pressure regulator, and further including the step of computing from the pressure-speed data the break pressure at which the regulator opens.

5. The method of claim 4, and further including the steps of comprising said break pressure with a reference pressure.

6. Apparatus for testing the lubricant system of an internal combustion engine, comprising pressure sensor means adapted to be connected to sense the lubricant pressure, engine speed sensor means adapted to sense the engine speed, and processing means responsive to said sensor means for determining the slope of the speed-pressure data during deceleration run of the engine.

7. Apparatus as in claim 6, wherein said processing means further including means for comparing said slope with a reference slope.

8. Apparatus for testing the lubricant system of an internal combustion engine, the system including a pressure regulator having a pressure break point, comprising pressure sensor means adapted to be connected to sense the lubricant pressure, engine speed sensor means adapted to sense the engine speed, and processing means responsive to said sensor means for determining said break point.

9. Apparatus as in claim 8, wherein said processing means further includes means for comparing said break point with a reference break point.

* * * * *

UNITED STATES PATENT AND TRADEMARK OFFICE
CERTIFICATE OF CORRECTION

PATENT NO. : 4,311,041
DATED : January 19, 1982
INVENTOR(S) : DAVID L. REID and DENNIS O. TAYLOR It is certified that error appears in the above-identified patent and that said Letters Patent are hereby corrected as shown below:

In column 1, line 38, the word "preferably" should read--preferable--;

In Claim 3, line 2, the word "comprising" should read--comparing--;

In Claim 5, line 2, the word "comprising" should read--comparing--

Signed and Sealed this

Twenty-seventh Day of April 1982

[SEAL]

Attest:

GERALD J. MOSSINGHOFF

Attesting Officer   Commissioner of Patents and Trademarks